United States Patent [19]

Boyd et al.

[11] Patent Number: 4,511,425

[45] Date of Patent: Apr. 16, 1985

[54] HEATED PAD DECORATOR

[75] Inventors: Mary G. Boyd, Framingham; Donald R. Smith, Hingham, both of Mass.; Peter F. Imondi, Providence, R.I.; Norman A. Hiatt, Framingham, Mass.; Fritz E. Bauer, Shrewsbury, Mass.; John M. Anemaet, Millis, Mass.; Alfred K. MacKenzie, Wayland, Mass.

[73] Assignee: Dennison Manufacturing Company, Framingham, Mass.

[21] Appl. No.: 503,486

[22] Filed: Jun. 13, 1983

[51] Int. Cl.[3] .......................... B32B 31/00; B30B 5/02; B44C 3/00

[52] U.S. Cl. .......................... 156/493; 156/542; 156/581; 156/583.3; 156/584; 156/235; 100/211; 100/93 P

[58] Field of Search ............ 156/249, 320, 493, 583.3, 156/475, 499, DIG. 36, 361, 584, 358, 235, 240, 359, 581, 486, 540, 541, 542, 582, 566, 568, 494; 100/211, 269 A, 269 B, 207

[56] References Cited

U.S. PATENT DOCUMENTS

| | | | |
|---|---|---|---|
| 3,101,898 | 8/1963 | Mader, Jr. | 156/359 |
| 3,109,367 | 11/1963 | Walkup et al. | 156/359 |
| 3,500,566 | 3/1970 | Holyoake | 100/211 |
| 3,660,208 | 5/1972 | Hubbard | 156/359 |
| 3,840,420 | 10/1974 | Sarcia | 156/359 |
| 3,865,671 | 2/1975 | Kronsder | 156/493 |
| 3,968,282 | 7/1976 | Engel | 100/211 |
| 4,016,021 | 4/1977 | La Fleur | 156/582 |
| 4,156,589 | 5/1979 | Schmitt et al. | 100/211 |
| 4,175,993 | 11/1979 | Robertson | 156/542 |
| 4,193,341 | 3/1980 | Clements et al. | 100/211 |
| 4,273,604 | 6/1981 | Johnston | 100/211 |
| 4,379,018 | 4/1983 | Griesdorn | 156/359 |
| 4,381,211 | 4/1983 | Neychay | 156/361 |
| 4,383,880 | 5/1983 | Geurtsen et al. | 156/361 |
| 4,392,905 | 7/1983 | Boyd et al. | 156/493 |

*Primary Examiner*—Edward Kimlin
*Assistant Examiner*—Louis Falasco
*Attorney, Agent, or Firm*—Arthur B. Moore; Barry D. Josephs; George E. Kersey

[57] ABSTRACT

Apparatus for heat transfer labelling of articles using a resilient pad maintained at elevated temperatures. Decorative laminates affixed to a support member such as a web are fed to a heated platen. A resilient pad consisting of a silicone elastomer is pressed against the laminate at the heated platen, whereby the laminate adheres to the pad when it retracts from the platen. The heated pad is then pressed against an article to be labelled, to which the transfer substrate adheres in preference to the pad surface. The resilient pad is typically heated to a temperature above ambient temperature but lower than that of the heated platen. The pad is heated by repetitive contact with the platen, and additionally by an independent heater. The pad may include one or more interior heating elements, or an exterior radiant heater located adjacent the pad during periods between label transfers. This apparatus is well suited to the labelling of articles of a wide variety of sizes, shapes, and materials.

22 Claims, 13 Drawing Figures

HEATED PAD DECORATOR

BACKGROUND OF THE INVENTION

The present invention relates to heat transfer decoration, as well as to the decoration of objects using a deformable pad.

A widely employed prior art method for imprinting designs onto articles using a heat transfer labelling process employs a paper base sheet or web coated with a label consisting of a release layer over which a design is imprinted in ink. In one successful technique of heat transfer decoration, labels of the above description are transferred to bottles or other articles using heat and pressure by feeding the article to a transfer site, where the preheated label-bearing web is impressed against the bottle to transfer the label. Patents illustrative of the above method and apparatus, commonly assigned with the present application, include U.S. Pat. Nos. 2,981,432; 3,064,714; 3,079,979; 3,208,897; 3,231,448; 3,261,734; and 4,214,937. This decorating technique, while highly successful in achieving high quality label transfer to bottles and similar articles, suffers certain limitations in the decoration of articles of unusual shape. Since the laminate is transferred directly to the article from a broad continuous web, this prior art process and apparatus is unsuitable for the decoration of surfaces having compound or sharp curvature. The method is therefore not easily adaptable to imprinting objects having surfaces of compound or irregular curvature or recessed panels.

Another type of apparatus which possesses special advantages in the decoration of objects of unusual conformation is the so-called pad-transfer decorator. This apparatus utilizes a resilient pad, typically comprised of a silicone elastomer. The pad receives an ink impression to be transferred to an article by pressing against an intaglio plate which had been previously coated with ink with any excess ink removed. The ink-bearing pad is then pressed against the article to be labelled, to which it imparts the ink impression. The resilient pad is adaptable to a wide variety of article conformations. This decorative method and apparatus involve assembly-line equipment of a simpler design than the above discussed heat-transfer decorators, and therefore requires fewer adjustments in retooling to articles of a variety of sizes and shapes. However, this process only transfers one color of ink at a time, and is thus slow and cumbersome if multicolored designs are required. Also since there is no protective coating covering the ink design, it is left exposed directly to the environment upon transfer to the article.

U.S. Pat. No. 3,887,420 disclsoes the use of a silicone rubber pad to transfer designs from a decorative laminate to ceramic articles. The laminate includes a base layer such as a paper sheet overlayed with a coating of wax. The wax coating is coated with a film layer (Film B), which in turn is overcoated with an ink design layer and a second film (Film A). As the laminate is heated to within a narrow ten degree temperature range, Film A is alleged to become adhesive while the wax coating and Film B become molten and nonadhesive. The transfer pad purportedly sticks to Film A when it is pressed against the laminate so that as the transfer pad is withdrawn, the substrate composed of the paper sheet and wax coating separates from the remainder of the laminate. The laminate adhering to the transfer pad is pressed onto a ceramic article, and the temperature of the laminate is dropped to within a narrow ten degree temperature range. At this temperature, Film B becomes adhesive and Film A is alleged to exhibit diminished adhesion. Thus, as the laminate is pressed onto the article with Film B contacting the article, the laminate is said to adhere to the article and released from the transfer pad as the pad is withdrawn.

The film layers A and B are each adhesive over only a very narrow ten degree temperature range, making it impractical to control the described process within the context of an automated process, since each film layer must in turn be heated or cooled to within the required ten degree temperature range to make the process workable. Precise heating or cooling of Film A and Film B to within such narrow temperature ranges is impossible to achieve or control within the split second time intervals required by an automated assembly process. This reference does not disclose the use of an independent pad heater, nor details of pad composition, surface texture, or other parameters crucial to its implementation. Furthermore, the inclusion of a wax layer to form part of the decorative substrate has the disadvantage that as the substrate is released from Film B there will be a strong tendency for a portion of the wax to remain attached to Film B. This will interfere with the adhesive characteristics of Film B as the laminate is transferred from the transfer pad to an object.

Japanese patent publication Sho No. 56-80488 discloses pad transfer decoration apparatus employing a heat-softenable transfer sheet incorporating a wax release layer, in which the article to be heated is preheated to enhance the adhesive properties of the label. This apparatus suffers the limitations of U.S. Pat. No. 3,887,420 due to the use of a wax release layer, and discloses no construction details of the decorator apparatus.

Accordingly, it is an object of the present invention to provide decorating apparatus suitable for automated transfer of labels to articles. It is a particular object of such method and apparatus that it combine the advantages of adaptability to a variety of article sizes and shapes and multicolored label capabilities.

Another object of the invention is that the apparatus be characterized by rapid and efficient operation. A related object is a multicolored decoration capability without the need for successive decorative stages.

A further object of the invention is the design of durable, reasonably inexpensive decorative apparatus. It is a further related object to avoid prolonged "down time" between decoration runs.

Yet another object of the invention is the design of decorative apparatus which is adaptable to a variety of articles. Such apparatus, for example, should be suited to the decoration of plastic, glass, and ceramic articles.

Still another object of the invention is the achievement of high quality decoration of articles. The apparatus of the invention should impart a desired image completely and without significant distortion. A particular object in this regard is the provision of high gloss images.

SUMMARY OF THE INVENTION

In furthering the above and additional objects, the invention provides apparatus for heat transfer decoration of articles using a resilient pad. The apparatus of the invention includes a transport assembly for a label carrier web, which routes labels past a preheater to a heated platen, and a resilient pad which is pressed against the web at the platen wherein a heat-softened label adheres to the pad's surface and is removed from the web with the retraction of the pad. The label-bearing pad is then pressed against an article to be decorated, leaving the label permanently bonded to the article upon retraction of the pad. The resilient pad desirably includes an independent heater for maintaining the surface of the pad at a second temperature somewhat below the platen temperature during the period between receiving the label and imparting it to an article.

The apparatus of the invention is advantageously employed in the heat transfer decoration of articles using the decorative laminates disclosed in commonly assigned applications Ser. No. 288,589 now U.S. Pat. No. 4,392,905 and Ser. No. 473,906. Such decorative laminates consist of a resinous coating layer in contact with the web, and an ink layer, and optionally include a protective coating layer over the ink layer and a barrier layer between the resinous coating layer and ink layer.

In accordance with one aspect of the invention, the resilient transfer pad desirably consists of a heat-resistant elastomer, most preferably silicone rubber. In one embodiment, the transfer pad is formulated of a polysiloxane resin, with or without plasticizer such as silicone oil. The formulation is chosen to provide a suitable pad resiliency, while avoiding an overbalance of components which would be vulnerable to degradation at elevated temperatures. Preferably, the pad has a hardness on the Shore 00 scale in the range 5–100, generally tending toward lower values in the decoration of articles of marked curvature. The pad may consist of a single molded body of elastomer, or alternatively of a plurality of layers, of like or varying formulations.

In accordance with another aspect of the invention, the resilient pad is generally configured in accordance with the size and shape of an article to be labelled. The apex of the pad is advantageously profiled to provide essentially complete pick-up and release of a label. Advantageously, the transfer pad has a surface texture in accordance with the desired appearance of the transferred labels, i.e. a smooth, glossy surface to impart a like texture to the labels, or a rougher surface texture to achieve a matte effect.

Still another aspect of the invention concerns the design of suitable means for heating the pad. The pad is continually heated during normal operation by indirect contact with the heated platen during label pick-up. For reliable, high speed operation this heating may be supplemented by an independent heater. In the preferred embodiment, such a heater comprises an interior heating element embedded within the pad material, which heats the pad's surface by conduction. Advantageously, such a heater comprises an array of resistively heated wires within the elastomer matrix. These heating elements are designed with particular attention to maintaining pad resiliency.

In an alternative embodiment, the pad consists of an elastomeric bag which is inflated to a desired shape and resiliency. In the preferred version of this embodiment the inflating medium is air. Alternatively, the pad may be filled with a liquid, such as an oil, which is compatible with the pad material. The inflating medium is heated, and heats the pad by convection. The inflated pad profile may be controlled by incorporating a plurality of elastomeric skins, and by locally varying the wall thickness. In a further alternative embodiment, the pad is externally heated using radiant heaters.

In still another aspect of the invention, sufficient heat is supplied to an undersurface of the label-bearing web by the platen so that the resinous coating softens and begins to melt, while the label's surface becomes tacky. The softened resinous coating functions as a release layer permitting the label to be removed from the web when the pad forms adhesive contact with the tacky label surface. Advantageously, in connection with the label formulations of the preferred embodiment, this involves heating the label to a temperature of about 270° F. to 420° F., more preferably 300° F.–380° F. The transfer pad is heated to a surface temperature preferably between 50° F. and 250° F. lower than the platen temperature, typically to a temperature in the range 100° F. to 300° F. These temperature ranges might be modified if employing an alternative label chemistry. The heating of the pad causes the resinous layer to remain tacky after release from the web and this layer may exhibit an increase in its adhesive character after removal of the pad. At the same time, the drop in temperature upon removal from the platen causes a decreased adhesive coefficient in the layer in contact with the pad.

In the preferred embodiment the web heating assembly, including platen and preheater, is mechanically designed to accommodate a variety of label pitches and widths. This assembly preferably has a convex curvature to provide a tight wrap of the carrier web.

Yet another aspect of the invention concerns the implementation of this decoration method in an automatic, high speed machine. Typically, in such a machine the time elapsing between release of the label from the web and contact with the article is less than about five seconds, and the time interval between initial contact of the label with the article and withdrawal of the transfer pad is less than 1 second. The decorator of the preferred embodiment utilizes electro-optical label registration to provide rapid, label-by-label advance of the carrier web, in accordance with U.S. Pat. Nos. 4,381,211 and 4,383,880. The principal elements of this system are a metering roll with internal clutch and brake assemblies, which provides intermittent web advance; an electro-optical scanner assembly; a shaft encoder to monitor metering roll rotation; and a timing assembly to coordinate web advance with an article conveyor and pad transport.

Still another aspect of the invention compares the design of apparatus of the above-described type incorporating multiple transfer pads. In a high speed automatic decorator this arrangement increases the decoration rate in accordance with the number of pads in simultaneous use. In a preferred version of this embodiment, two or more pads pick up labels simultaneously with label transfer to articles by a like number of pads. Advantageously, this utilizes a pad mounting assembly which rotatably conveys pads between label pick up and article decoration sites, where the assembly is lowered to simultaneously pick up and release labels.

BRIEF DESCRIPTION OF THE DRAWINGS

The above and additional aspects of the invention are further illustrated with reference to the following detailed description, taken jointly with the drawings in which.

DETAILED DESCRIPTION

Figure 1:
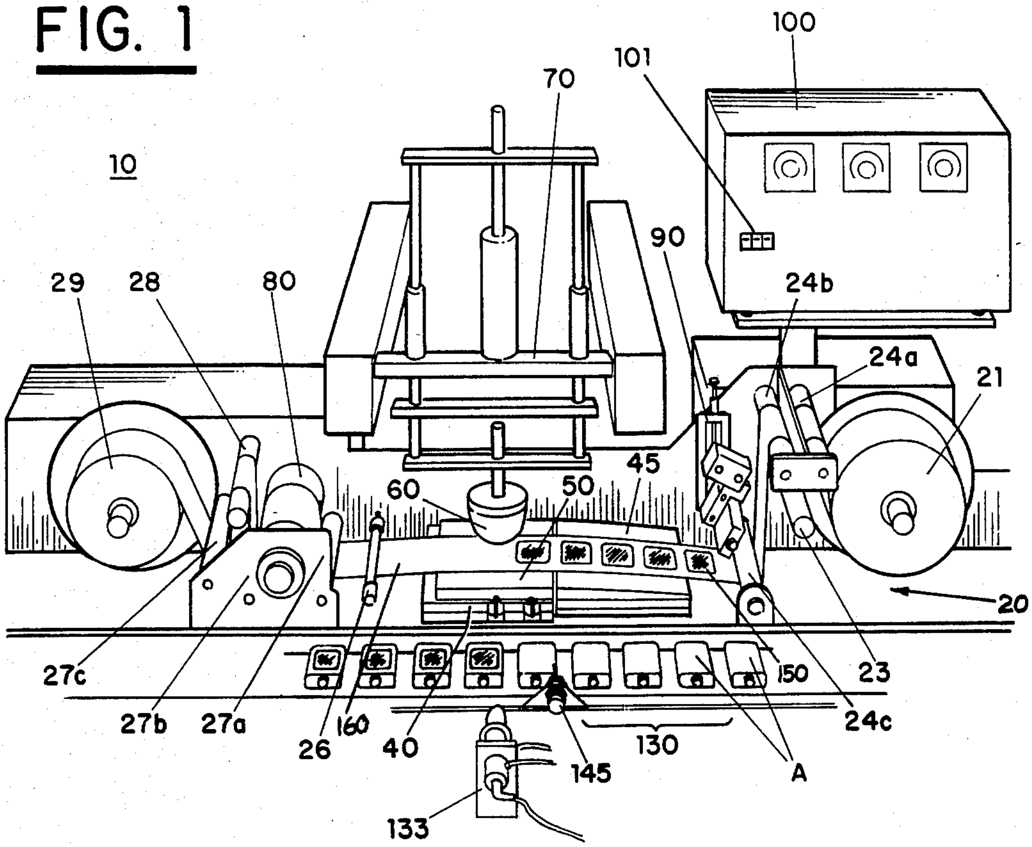
FIG. 1 is a perspective view of a heated pad decorator in accordance with the preferred embodiment.

Reference should be had to FIGS. 1–10 for a detailed description of heat transfer decorating apparatus in accordance with the preferred embodiment of the invention. FIG. 1 gives an overall perspective view of a heated pad transfer apparatus 10. The apparatus 10 is designed to transport a plurality of labels 150 on a carrier web 160 to a heater assembly 40, where each label is heated and removed from the web by a heated, resilient transfer pad 60. The pad 60 transfers label 150 to an article A such as a bottle which is transported to the decorating site by a conveyor 130. There the pad, heated to an elevated temperature, is pressed against the article causing the label 150 to form a permanent adhesive bond thereto. The pad is then retracted and the cycle repeated. Preferred chemical formulations for labels 150, are disclosed in commonly assigned copending applications Ser. No. 288,589, now U.S. Pat. No. 4,392,905, and Ser. No. 473,906.

The principal operational areas of pad transfer decorator 10 are the web transport 20, for conveying the label carrier web 160 through the label pick-up site; a heater assembly 40 for heating the labels 150 by conduction through the carrier web 160; a resilient transfer pad 60 and associated transport 70 for picking up the labels at heater assembly 40 and conveying them to the article decoration site where they are transferred to articles A; an article conveyor 130 for conveying articles to and from the decoration site; and a control module 100 for coordinating the various operations of decorator 10. In the preferred embodiment of the invention, the web transport 20 utilizes an electronic label registration system in accordance with commonly assigned U.S. Pat. Nos. 4,381,211 and 4,383,880, as discussed in detail below. Advantageously, the various subassemblies of decorator 10 are designed for independent operation, facilitating assembly of a decorator and substitution of parts.

Figure 9:
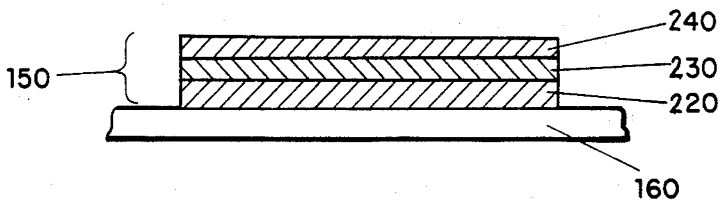
FIG. 9 is a sectional schematic view of a preferred form of decorative laminate to be transferred by the apparatus of the invention.
Figure 10:
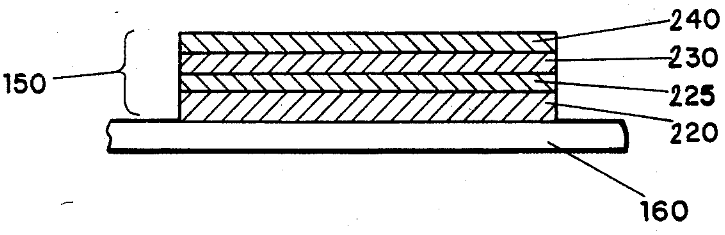
FIG. 10 is a sectional schematic view of an alternative form of decorative laminate to be transferred by the apparatus of the invention.

In the preferred embodiment of the invention, labels 150 are composed of a resinous coating layer 220 and imprint ink layer 230, and a protective coating layer 240 (FIG. 9). The resinous coating layer 220 advantageously functions as a release layer to permit separation of label 150 from carrier web 160 during one stage of the transfer process, and ultimately as a permanent adhesive to bond the ink layer 230 to article A. Optionally, as shown in FIG. 10, the labels 150 further include a barrier layer 225 between ink layer 230 and resinous coating 220. Labels 150 are formed by providing web 160 with resinous coating 220, and overcoating the remaining layers in turn.

The barrier layer 225 illustrated in FIG. 10 prevents absorption of the ink of layer 230 into the resinous coating 220. Use of a protective coating layer 240 is particularly advantageous when the container contents include corrosive or abrasive elements such as alcohol, toiletries, food and beverages, or frozen goods. Alternatively, protective coating layer 240 may be omitted from the label 150.

The resulting label has the property that the design, which may be either a monochrome or multicolored design, is undistorted regardless of the type of curvature of the surface of article A and regardless of whether the article is composed of ceramic, glass or plastic. For decoration of plastic bottles and other deformable articles, a bottle inflating device 133 (FIG. 1) may maintain the shape of the articles during labelling. Furthermore, the outline of the protective coating layer 240 or the resinous coating 220 on the article is essentially invisible upon normal inspection.

The affixed label is generally not subjected to firing, but it should be appreciated that if article A is composed of glass or a ceramic material, an inorganic flux material may be added to form ink layer 230. In this case if label 150 is exposed to high temperature firing, the organic layers 220 and 240 are volatilized leaving ink layer 230 fused to the article. Optionally, articles of this type, of relatively high mass, may be preheated prior to decoration to facilitate label transfer.

Preferred chemical description of the various layers of label 150 is given commonly assigned applications Ser. No. 288,589 now U.S. Pat. No. 4,392,905, and Ser. No. 473,906. The layer 220 is advantageously composed of a polyamide resin having a softening point between about 95°–105° C. In particular, layer 220 may comprise the polymerization product of a linear methylene diamine and a dimerized fatty acid. Ink layer 230 may be composed of any conventional formulation of any color, including halftone colors. It is preferred to employ inks which will not migrate into layer 220 in the absence of a barrier layer 225. Various polyester, acrylic, and vinyl resins may be employed for protective layer 240 and barrier layer 225.

GENERAL OPERATION

With further reference to FIG. 1, the label carrier web 160 is supplied from an unwind reel 21, and is routed through various web handling stations including a dancer roll 23, and idler rolls **24*a*, 24*b*, and 24*c*; past an electro-optical scanner assembly 90; over a heater assembly 40, which includes a preheater 45 and a heated platen 50; under a cooling duct 26 for cooling the heated web (now devoid of labels); past further idler rolls 27, a metering roll 80, and takeup dancer roll 28; finally to a takeup reel 29**. In the preferred embodiment of the invention, characterized by electro-optical control of web advance, the web transport is intermittent in nature, wherein the web is periodically advanced over an interval corresponding to the label pitch.

Carrier web 160 bears labels 150 over preheater 45 where the thermoplastic materials of these labels are softened by exposure of the web to a temperature on the order of 100° F.-250° F. During further advance of the web, a label 150 to be transferred is advanced from preheater 45 to the heated platen 50, where the web is exposed to an elevated temperature on the order of 270° F.-420° F., most preferably 300° F.-380° F., i.e. sufficiently high to melt the label portion contacting web 160, to permit separation of the label from the web. Advantageously, using the preferred label constructions of FIGS. 9, 10, the web is heated to a temperature between about 50° F. and 100° F. above the melting point of the resinous coating 220. This causes protective coating 240 (or ink layer 230 if protective coating 240 is not included in label 150) to become tacky and resinous coating 220 to soften and melt to permit the label to be removed. The above temperature ranges, which are well suited to the label compositions of the preferred embodiment, may be appropriately modified if employing an alternative label chemistry.

At platen 50, the heated transfer pad 60 is pressed against label 150 so as to contact the protective coating 240 (or ink layer 230 in the event protective layer 240 is omitted). The transfer pad is then withdrawn (usually within a second of initial contact) at which time coating 220 splits to separate from web 160. The coating 240 or ink layer 230 is sufficiently adhesive at this time that the label 150 adheres to the transfer pad 60, remaining in adhesive contact therewith with resinous coating 220 exposed to the environment.

The resilient transfer pad 60 is heated to an elevated surface temperature in order to maintain the label materials in a softened, tackified condition, permitting eventual transfer and bonding of the label to an article A. This surface temperature is typically between about 50° F. and 250° F. less than the temperature of platen 50. A typical surface temperature range for transfer pad 60 is between about 100° F. and 300° F., more preferably 150° F.-250° F.

With further reference to FIG. 1, the label-bearing transfer pad 60 is then conveyed to a position over an article A to be labelled, and lowered to impress the label 150 onto the article, so that the resinous coating layer 220 comes into pressure contact with the article. The article A may consist of any of a wide range of materials including, for example, ceramics, glass, and a wide variety of plastics. In a high speed automatic decorator, the time interval between label pick up and transfer of the label to the article is preferably less than about 5 seconds, more preferably between about 0.2 to 5 seconds.

TRANSFER PAD

Transfer pad 60 advantageously is formulated of an elastomeric material providing the requisite deformability, release characteristics, and high temperature performance. The transfer pad is most preferably composed of silicone rubber since silicone rubber is a suitably resilient and durable material which does not degrade when subjected to the elevated temperature levels characteristic of the invention. It has been found advantageous to provide the silicone rubber pad with a smooth, glossy surface where it is desired that the transferred label have a glossy appearance. A smooth surface may be achieved for transfer pad 60 by casting the pad formulation in a mold with a glossy inner surface. A polystyrene mold, for example, may be provided with a glossy cellulose acetate liner to achieve the desired smoothness. Alternatively, a rougher surface texture for transfer pad 60 may be advantageous in order to achieve a matte effect in transferred labels 150.

Any room temperature or heat curable silicone rubber may be employed to make the pad 60. Silicone mixtures for room temperature vulcanizing (RTV) are commercially available in a two-part system which is ready for mixing in the presence of a catalyst, such as a platinum catalyst. The mixture may be cured at room temperature, or at elevated temperature for a short time, to produce the silicone rubber product. Such two-part systems typically entail the reaction of silicone hydride cross linkers with low molecular weight siloxane polymers having reactive groups such as vinyl groups.

Room temperature vulcanizable silicone reactive mixtures as above-described can be purchased generally under the RTV tradename series from General Electric Company of Pittsfield, Mass.

The pad may also be formed in conventional manner by casting room temperature vulcanizable silicone rubber with or without compatible plasticizer to regulate the softness of the pad. The plasticizer may typically be, but is not limited to, an oligomeric organosilicone as, for example, described in U.S. Pat. No. 2,890,188. The pad hardness is desirably adjusted to between about 5 and 100 on the Shore 00 scale with a tendency toward the lower values in decorating objects having surfaces of compound or irregular curvature, or recessed panels. The hardness of the pad is adjusted to provide suitable deformability to pick up the entire expanse of the label, and to conform to an article of a given shape. The heat transfer labelling apparatus of the invention enables the decoration of articles of unusual configuration, with involute curvature, recessed panels, etc.

Figure 2:
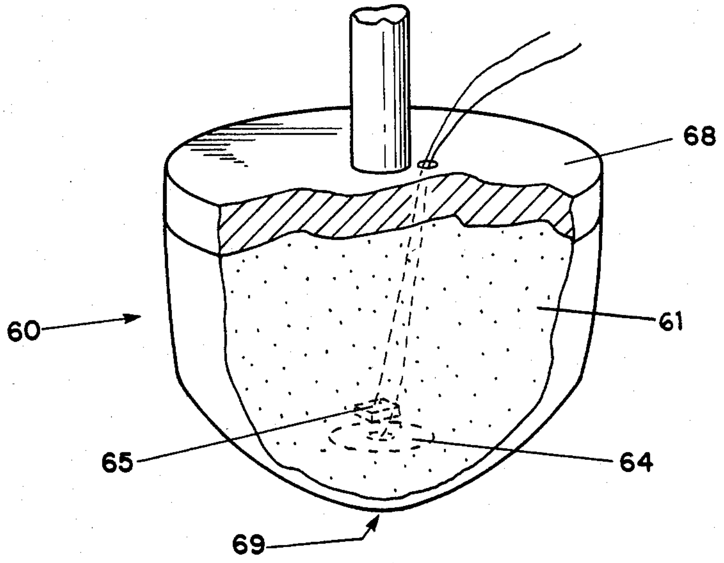
FIG. 2 is a cutaway perspective view of a preferred heated pad for the apparatus of FIG. 1.

In a preferred embodiment of the invention, as seen in FIG. 2, the pad 60 comprises a solid molded elastomeric body 61, which is provided with one or more internal heating elements 64 capable of maintaining the pad surface at temperatures up to about 300° F. An electrical heating coil or equivalent heating element may be placed within the mold prior to the casting operation so that the heating coil will become embedded within the rubber pad as the pad hardens in the mold. For example, a heating element 64 may be placed behind the nose 69 of the pad 60 (FIG. 2). A thermistor 65 may be utilized to monitor the pad's internal temperature. It is preferred to utilize flexible heating elements 64, inasmuch as unduly stiff elements might interfere with the flexure of pad 60.

In some cases, the pad surface may be heated to the required temperature levels without the use of independent heating elements; the pad 60 may be heated to the required temperature by periodically pressing the pad surface against the heated, label-bearing platen 50. However, the use of an additional heating element 64 is generally preferred since it affords a greater degree of temperature control and is a more reliable method of maintaining the pad at the required temperature levels, particularly to preheat the pad prior to operation, such as after an interruption in decorating. The transfer pad surface in contact with the transfer laminate preferably takes a convex form, but the optimum pad shape for a given article to be labelled is best determined empirically. The apex 69 of the pad, in particular, should be configured to provide essentially complete pick-up and release of labels.

Figure 3A:
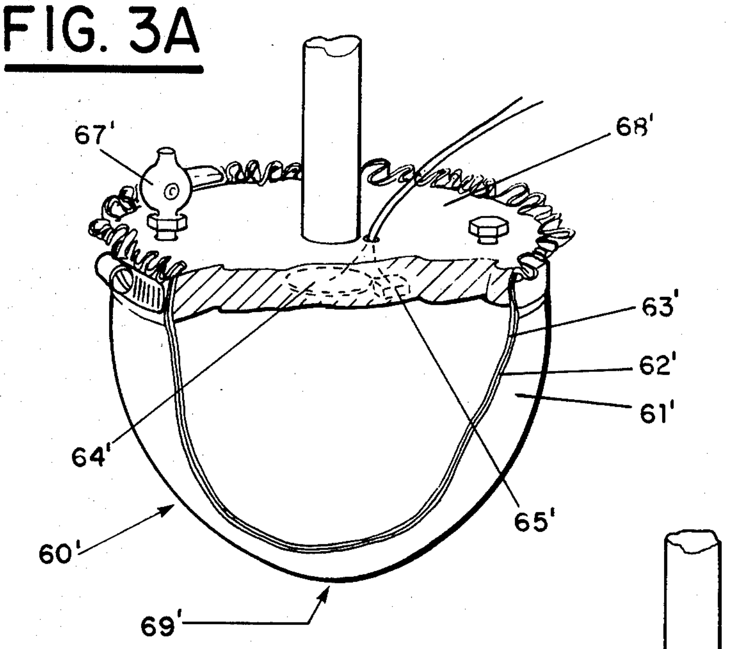
FIG. 3A is a cutaway perspective view of an alternative heated pad design for apparatus of the type shown in FIG. 1.
Figure 3B:
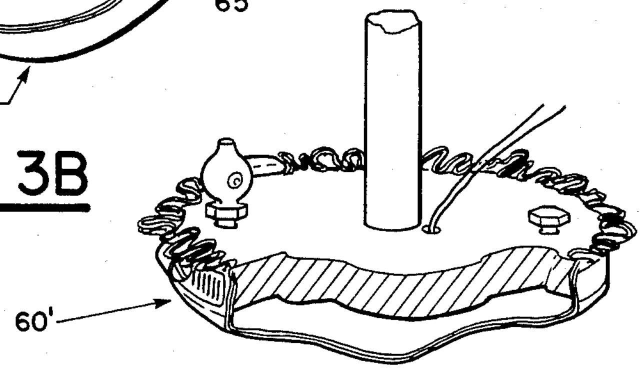
FIG. 3B shows in perspective the transfer pad of FIG. 8A, deflated.

An alternative type of heated transfer pad is shown at 60' in the partially sectioned view of FIG. 3A. In lieu of the solid molded pad 60 of FIG. 2, pad 60' consists of an elastomeric bag 61' which is sealed to a base plate 65'. The bag 61' (shown collapsed in FIG. 3B) is inflated to a desired shape and rigidity by inflating it with air through valve 67'. The pad is convectively heated to a desired surface temperature by heating the inflating air, such as by using an internal heater 64' mounted to base 68'. Alternatively, the pad 60' may be filled with a liquid, such as an oil, which is compatible with the composition of bag 61'.

The bag 61' of inflatable pad 60' illustratively consists of inner and outer skins 62', 63'. There is a tendency for such structures to form a spherical shape upon inflation, which would not achieve the preferred characteristic of apex 69'. The use of multiple skins 62', 63' with variable wall thicknesses at and near the apex 69' allows modification of the inflated shape for superior label pick-up and release; the skin 61' will exhibit localized protrusions in thinner areas. Illustratively, skins 61', 62' each comprise silicone rubber formulated in accordance with the earlier discussion; each skin having a wall thickness on the order of 0.1 inch.

In a further alternative embodiment of the invention, a pad 60' of the type shown in FIG. 2 is externally heated to the requisite surface temperature using radiant heaters (not illustrated). Such heaters would be mounted adjacent pad 60 to operate during the interim periods between label transfers, and would be withdrawn during label transfer periods.

WEB HEATER ASSEMBLY

Figure 4:
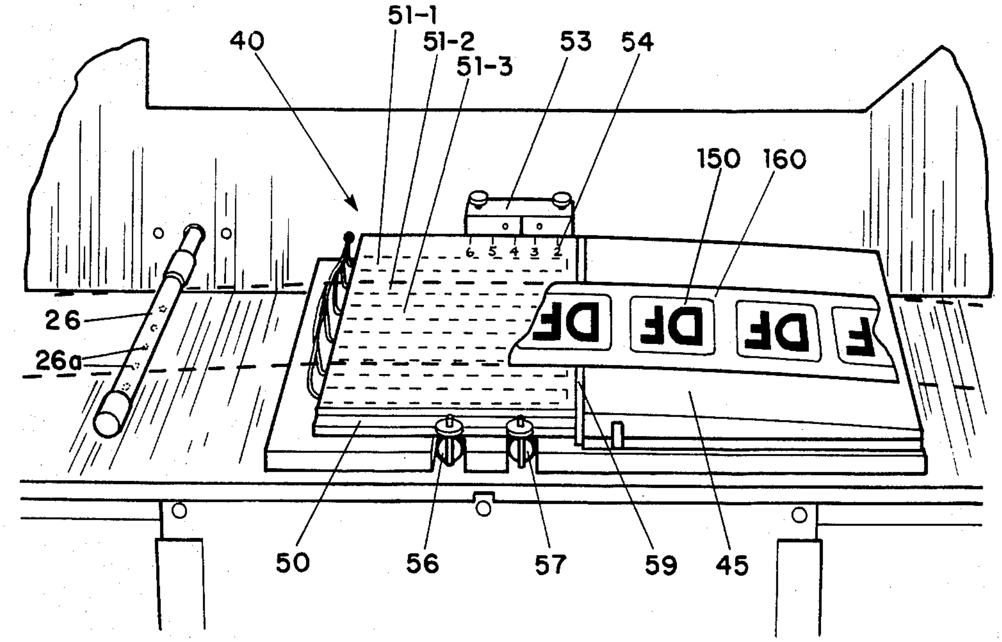
FIG. 4 is a perspective view of the web heater and cooling assemblies of the apparatus of FIG. 1.

As best seen in FIG. 4, the principal components of web heater assembly 40 are a preheater 45 and heated platen 50. The preheater 40 is maintained at a temperature in the range 100° F.-250° F. in order to heat labels 150 preliminarily to advancing these labels to the heated platen 50. At heated platen 50 the labels are further heated to a temperature on the order of 270° F.-420° F. It has been found preferable to expose only one label at a time to the heated platen 50 during a given machine cycle, except in the multiple pad embodiment discussed below in which a plurality of labels are simultaneously picked up from platen 50. In order to provide an invariable label pick-up site (roughly corresponding to the center line of the decorator) it is necessary to provide an adjustable mounting of heater assembly 40 to compensate for the label pitch. Assembly 40 includes a rear clamp mount 53 on its upper surface, which carries a scale of registration indicia 54 calibrating the heater position to the label pitch. This adjustment is made so that the web 160 will dwell with the gap between two labels approximately centered on the heat insulating spacer 59 between preheater 45 and platen 50 (i.e. spacer 59 is separated from center line 55 by half the label pitch).

Advantageously, preheater 45 and heated platen 50 are given a convex curvature in order to provide a tight wrap of web 160 over the heater assembly 40; this has been found to facilitate pick-up of labels 150 by pad 50. In the illustrated embodiment, the web heater assembly 40 is mounted on a pair of cylindrical bars 56 and 57 which act as bearing surfaces permitting the lateral adjustment of this assembly while maintaining the desired radius of curvature. To provide more precise control over the heating profile of platen 50, this structure may include a plurality of cartridge heaters 51-1, 51-2, etc., which are selectively actuated in accordance with the width of a label to be heated.

After label pick-up at transfer site 55, the carrier web 160 is advanced past a cooling duct 26, which includes a series of apertures 26*a* along its lower periphery. Pressurized air supplied to cooling duct 26 is emitted from apertures 26*a* to reduce the web temperature.

CARRIER WEB TRANSPORT

Figure 5:
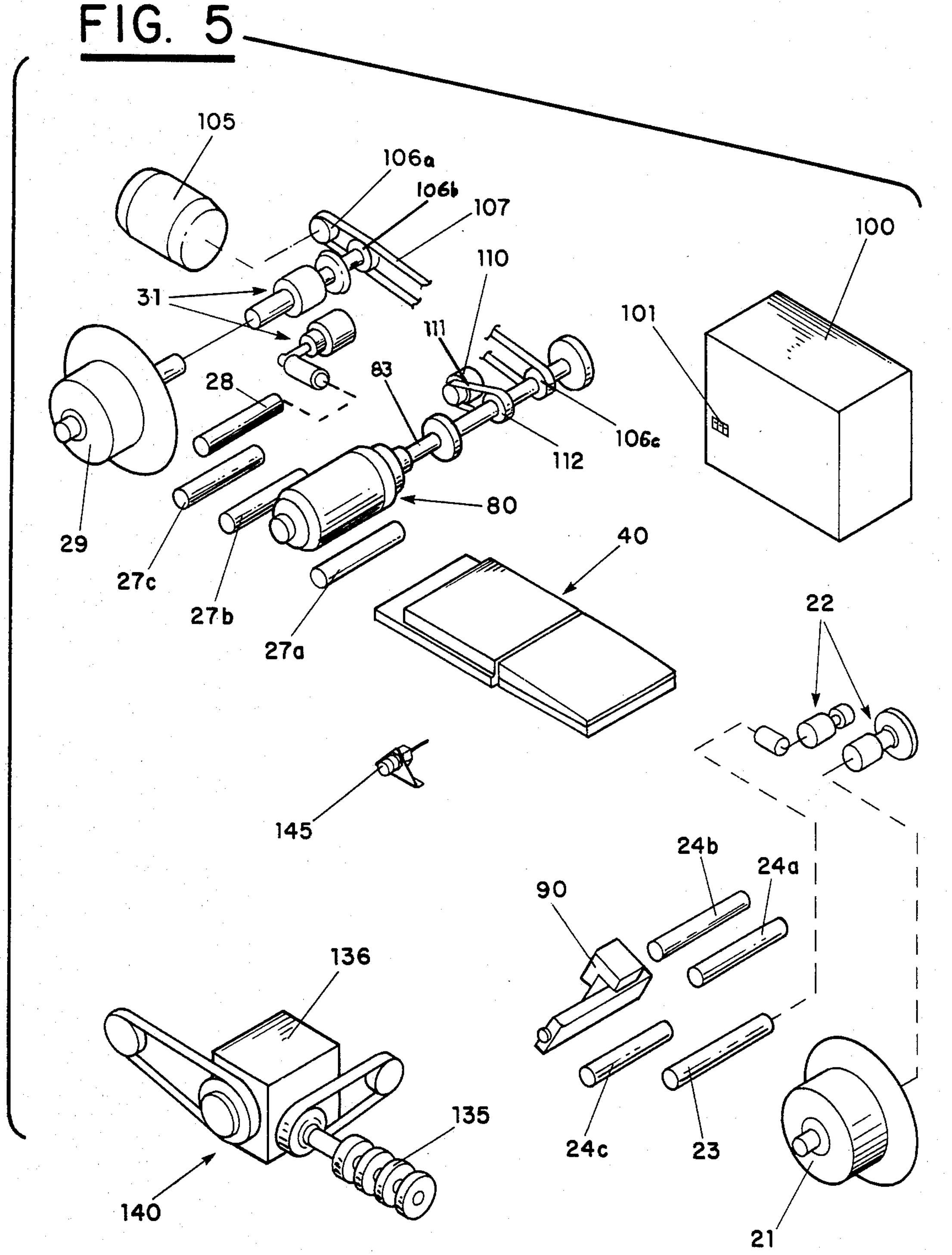
FIG. 5 is a partially schematic view of the web transport control elements of the apparatus of FIG. 1.

The preferred design of pad transfer decorator 10 incorporates an electro-optical subassembly 20 for labelby-label advance of carrier web 160; in the multiple pad embodiment described below, carrier web 160 may be advanced by label groups. FIG. 5 is a schematic view of various drive components of decorator 10 (in particular components for transporting the carrier web 160), as well as associated control apparatus. Timing belt 107 is driven from motor 105 via pulley 106*a* to provide the basic mechanical input for web transport 20. Takeup reel 29 is driven from the timing belt 107 via pulley 106*b*. A tension control assembly 31 controls the rotation of takeup reel 29 by means of a clutch, actuated and deactuated by the motion of clutch 28. A similar tension control assembly 22 located at the unwind reel 21 includes a brake, controlled by dancer roll 23. These mechanisms control the tension of web 160, according to the principles disclosed in commonly assigned U.S. Pat. No. 3,193,211.

Timing belt 107 also induces rotation of metering roll shaft 83 via pulley 106*c*. As discussed in detail below, the metering roll 80 includes internal clutch and brake assemblies which engage and disengage the metering roll shell 81 from shaft 83, thereby controlling web advance. As explained in detail below, these clutch and brake assemblies are actuated by signals from control circuit 100, in response to signals from photoelectric scanner assembly 90 and timing assembly 140.

The rotation of metering roll shaft 83 is monitored by shaft encoder 110, driven by pulley 112 and belt 111. Encoder 110 provides a digital output to control module 100 in proportion to the degree of rotation of metering roll shaft 83.

Conveyor drive shaft 135 provides mechanical input to article conveyor 130 and pad transport 70. The shaft 135 rotates 360° per machine cycle and provides a timing signal to the control module 100 via timing assembly 140 of the general type disclosed in U.S. Pat. Nos. 4,381,211 and 4,383,880. This timing assembly may be replaced by any device within decorator 10 which provides an output signal at a given phase of each decorating cycle. The control module 100 processes signals from shaft encoder 110, scanner assembly 90, and timing assembly 140 in order to output actuating and deactuating signals to the clutch and brake assemblies of metering roll 80. Control module 100 includes a logic circuit which achieves the following control sequence.

At an initial point of each decorating cycle the brake assembly 85 is engaged and the metering roll 80 is stationary (web dwell). At a given phase of the drive 135 for conveyor 130 and pad transport 70, the timing assembly 140 outputs a clutch actuating signal which initiates rotation of metering roll 180. This allows circuit 100 to accept counts from encoder 110. During the advance of web 160 a comparator compares the accumulated counts from shaft encoder 110 with a preselected total set by the user with digital switch 101 (FIG.

1). When this comparator outputs an "equals" signal, the circuit 100 is "enabled" so that an incoming signal from the scanner assembly 90 will actuate the metering roll brake assembly 85 and halt web 160 for label pick-up. The effect of this is to allow the system to respond to an optical contrast in web 160 only after it has advanced a distance somewhat less than the label pitch. Control circuit 100 may further include a safety override which automatically produces a brake actuating signal and sets off an alarm if the number of counts from encoder 110 exceeds a value corresponding to the maximum possible label pitch—indicating malfunction of scanner assembly 90 or some other problem.

An article sensor 145 just prior to the decorating station of conveyor 130 outputs a signal indicating the presence of an article A to be decorated; this signal is required to implement the above label advance sequence, as well as to actuate pad transport 70 (FIG. 1).

Figure 6:
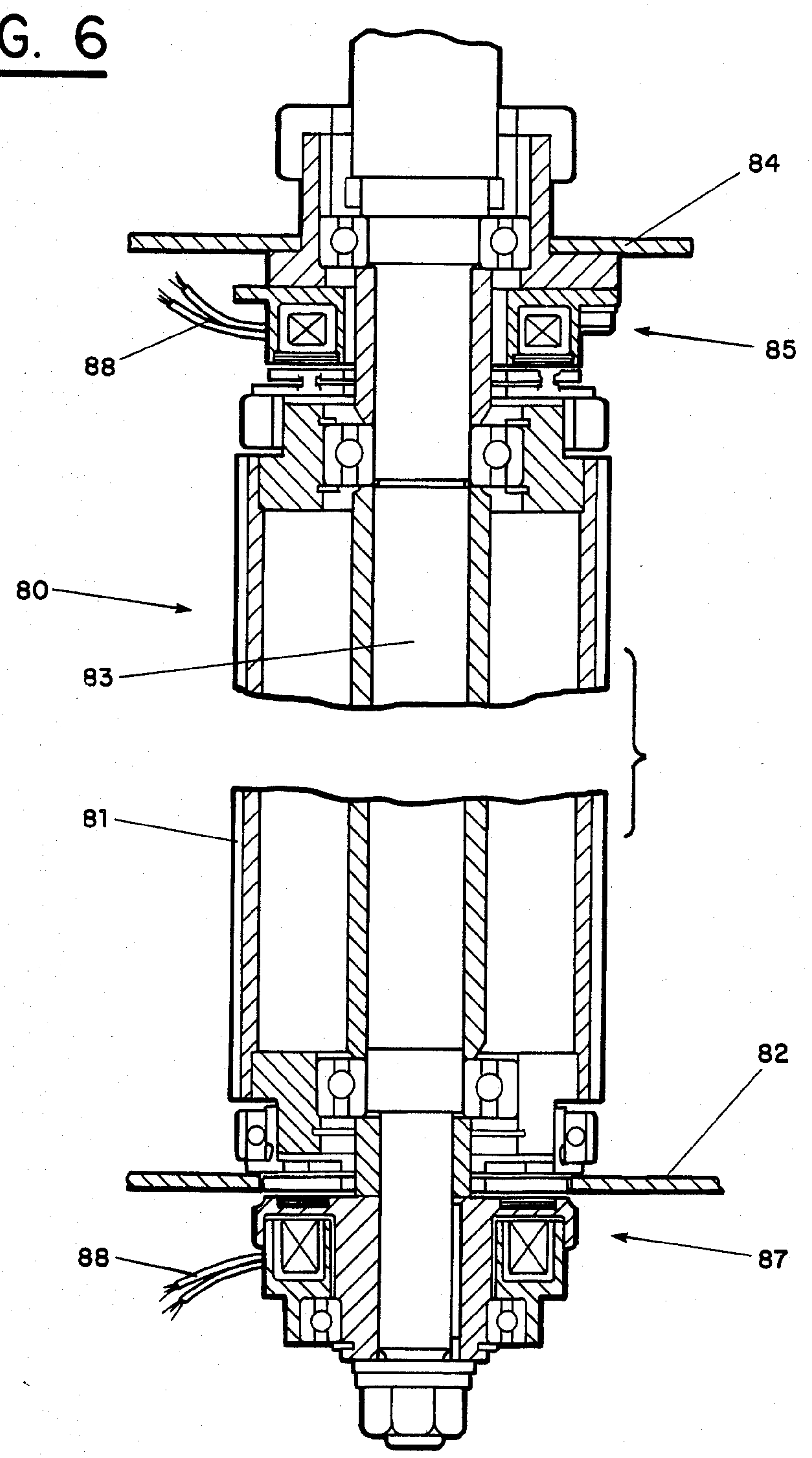
FIG. 6 is a sectional view of a metering roll with internal clutch and brake assemblies for the apparatus of FIG. 1.

FIG. 6 gives a partial sectional view of a preferred design of metering roll 80, as seen from above. Metering roll 80 comprises a metering roll shell 81 mounted circumjacent metering roll shaft 83. Metering roll 80 is horizontally mounted in a front support bracket 82 and a rear support wall 84. The metering roll including an internal electromagnetic brake assembly 85 at its rear end which holds the metering roll shell 81 stationary when actuated, and an electromagnetic clutch 87 at the front which when actuated allows the shell 81 to rotate in conjunction with shaft 83. The brake assembly 85 and clutch 87 each utilize a solenoid and armature plate arrangement, as disclosed in commonly assigned U.S. Pat. Nos. 4,381,211 and 4,383,880. Electronic control signals for the clutch and brake assemblies are routed through wires 88, from electronic control module 100 (FIG. 5).

Figure 7:
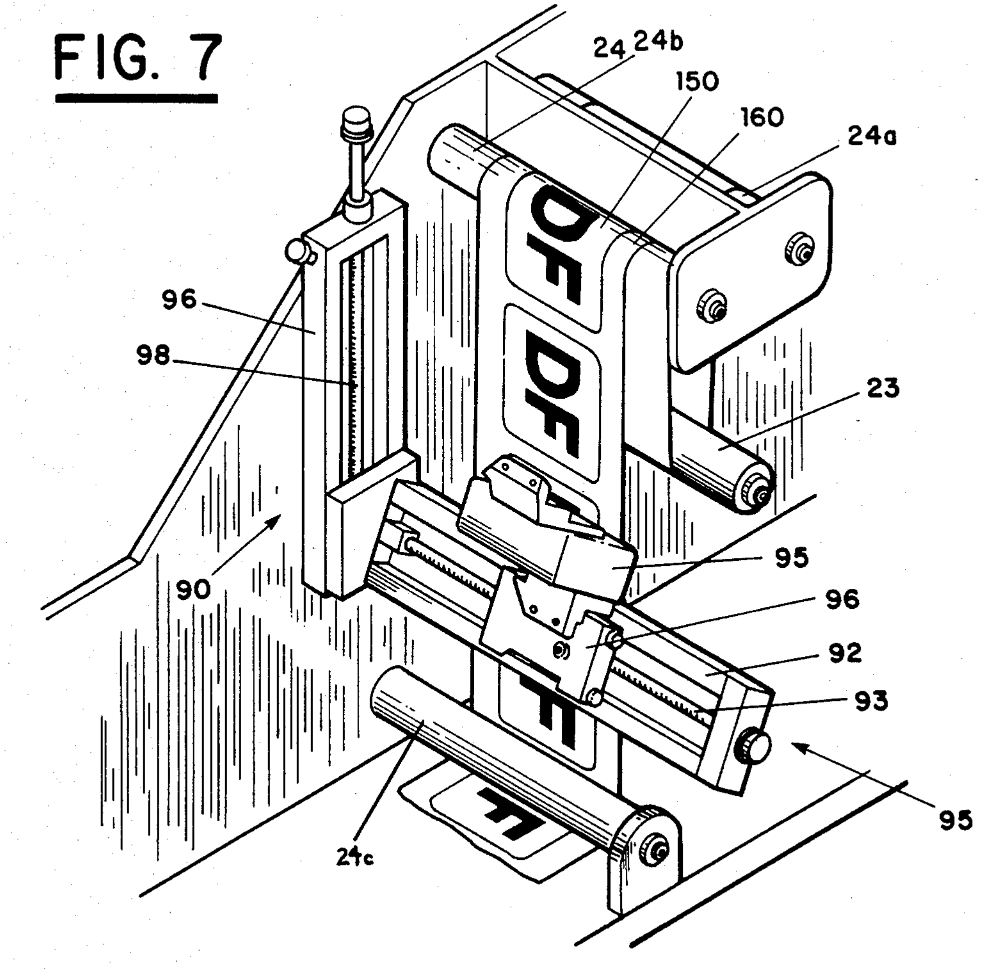
FIG. 7 is a perspective view of a preferred optical scanner assembly for the apparatus of FIG. 1.

FIG. 7 is a perspective view of an illustrative scanner assembly 90 to be employed for the optical detection of labels in the preferred embodiment. An advantageous design for scanner 90 is of the type disclosed in commonly assigned U.S. Pat. Nos. 4,381,211 and 4,383,880. Scanner assembly 90 includes a scanner 95 which is deployed to detect labels 150 on web 160 as it travels between the idler rolls 24*b* and 24*c*, which maintain the web in a taut condition. Scanner 95 is mounted to a bracket 96 which is carried on a support tower 92. Support tower 92 advantageously includes a track 93 to permit adjustment of the position of bracket 96 and scanner 95 along the support tower axis, i.e. along the transverse dimension of web 160. Scanner 95 may be mounted at a desired distance from web 160 by suitable adjustment of bracket 96. Support tower 92, in turn, is slideably mounted in a vertical track 98, to which it is secured in order to provide a desired reading location along the web axis. Tracks 93 and 98 illustratively comprise V-groove slides. Scanner 95 is preferably slanted from a perpendicular to web 160 in order to prevent sensing reflections from the surface of the web. The scanner 95 may include an internal light source, a sensitivity adjustment, and a control to select the capability of registering dark/light and light/dark optical transitions. Electro-optical apparatus having sensitivity to other wavelengths such as ultraviolet, or having chromatic reading capabilities, may be employed in lieu of the black/white scanner 95.

In setting up the decorator 10 to control web transport, with further reference to FIG. 1, the user sets digital switch 101 in accordance with the label pitch (or, in the multiple pad embodiment disclosed below, by the spacing of label groups), and adjusts the timing assembly 140 (FIG. 5) to coordinate the web dwell with the operatiion of article conveyor 130 and pad transport 70. After threading web 160, the user rotates metering roll 80 manually until label 150 is properly centered at the labelling site. The position of scanner 95 should then be adjusted along the transverse dimension of web 160 to be trained on a suitable registration point, i.e. one having an area of high optical contrast. The electronics of scanner 95 are typically adjusted according to whether there is a dark/light or light/dark transition at the chosen registration point; it is desirable to choose a registration point preceeded by a broad light or dark area. The user then positions the scanner 95 along the axis of web 160 at a location just beyond the selected point.

Figure 8:
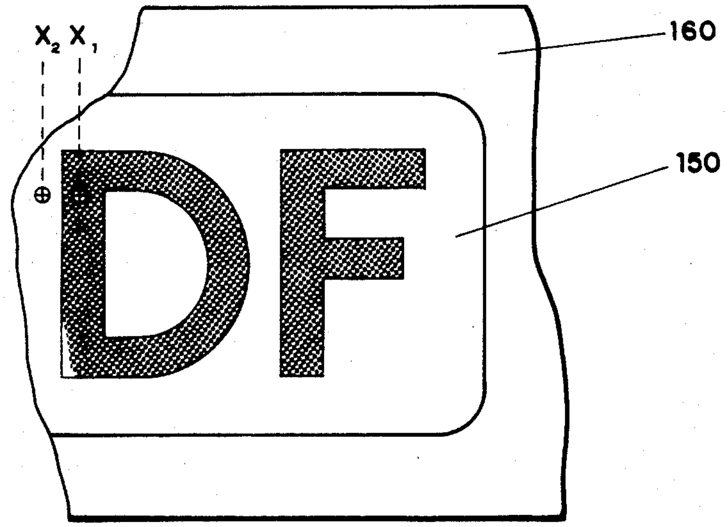
FIG. 8 is a plan view of a label, schematically illustrating photoelectric label registration.

With reference to FIG. 8, the user initially positions the scanner at X1 just beyond the registration point R. The user then determines the scanner sensitivity necessary to actuate control circuit 100. This process is repeated at point X2 prior to registration point R, and the scanner sensitivity is then adjusted to the average of the values thus determined. To test the operation of the machine, the scanner should be properly located for the registration point R, and the machine cycled for several labels until the metering roll starts and stops, feeding one label at a time. If decorator 10 has been properly calibrated, the registration point R should stop within the area illuminated by scanner 95 when the machine is jogged slowly, and the decorator should consistently provide a start-stop web transport motion.

MULTIPLE PAD DECORATOR

The apparatus of the above-illustrated embodiment, as best seen in FIG. 1, incorporates a single transfer pad 60. The pad transport assembly 70 includes conventional pneumatically actuated mechanisms for raising and lowering the pad, and for reciprocating the pad between front (article decoration) and rear (label pickup) positions.

In an alternative embodiment of the invention, the decorator incorporates a plurality of transfer pads 60*a*–60*d*. The use of four transfer pads improves the decoration rate, (e.g. in bottles per minute) by approximately a factor of four, due both to a halving of the cycle time, and to the simultaneous decoration of two articles per cycle.

Figure 11:
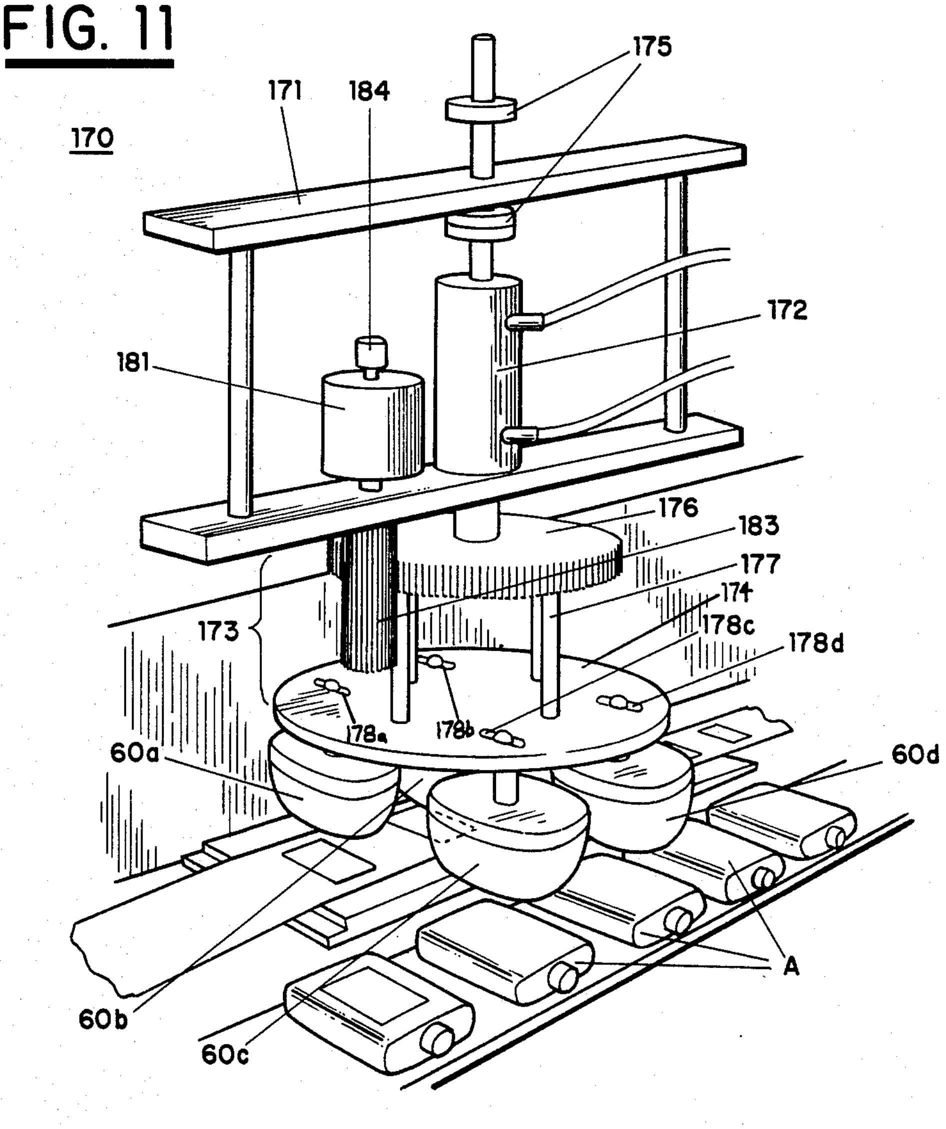
FIG. 11 is a perspective view of a multipad mounting and transport assembly in accordance with an alternative embodiment of the invention.
Figure 12:
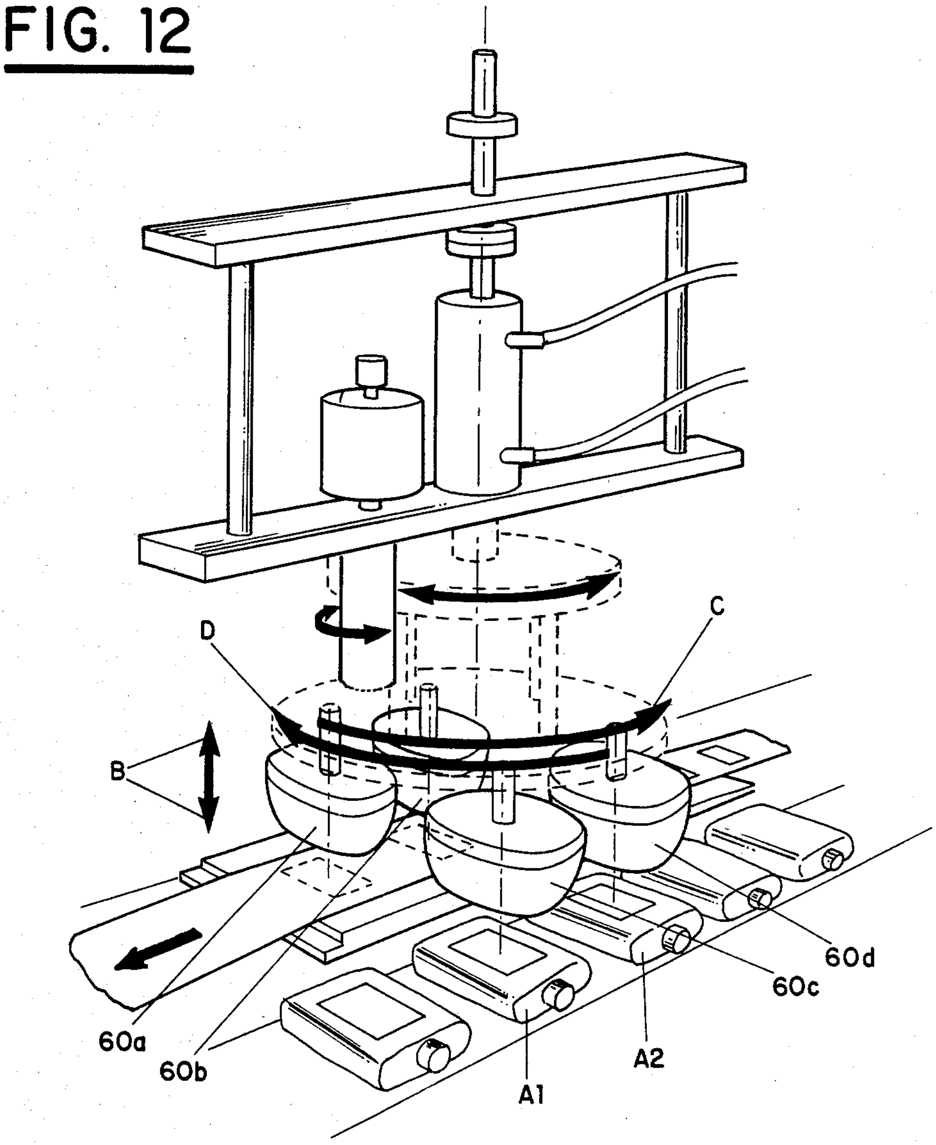
FIG. 12 is a partial perspective view of the apparatus of FIG. 11, schematically indicating the motion of various elements.

The multiple pad transport 170 (FIG. 11) incorporates a superstructure 171 somewhat similar to that of transport 70 (FIG. 1). Superstructure 171 houses an air cylinder 172, which pneumatically raises and lowers a pad mounting assembly 173, subject to the limitation of stops 175. Pad mounting assembly 173 comprises a mounting disk 174, coupled to a gear 176 by support rods 177. Pads 60*a*–60*d* are mounted within slots 178*a*–178*d* in disk 174; the disk is designed to provide a lateral pad separation (for example between pads 60*a* and 60*b*) in accordance with the spacing of labels 150, so that the pads may be properly centered on adjacent labels. A like separation is provided for articles A on conveyor 130. Disks 174 are interchangeable to accommodate different label pitches. The pad mounting within slots 178*a*–178*d* is slideably adjusted in accordance with the distance between labels 150 and articles A.

In lieu of the conventional, front-to-back pad reciprocation, mounting apparatus 170 utilizes a rotational motion to convey pads 60*a*–60*d* between label pick up and article decoration sites. A pinion gear 183 is rotatably mounted within superstructure 171 to drive motor 181. Pinion gear 183 engages gear 176 to induce the rotation of mounting assembly 173. A positional encoder 184 monitors the pad's rotation.

In operation, the pad mounting assembly 183 is rotated so that pads 60*a*, 60*b* are located over adjacent labels 150 at heater assembly 40. The mounting assembly 173 descends for label pick up, then retracts, as indicated by arrows B—B. Disk 174 then rotates 180° (as indicated by arcuate arrow C) so that label-bearing pads 60*a* and 60*b* are located over adjacent articles A on conveyor 130, while pads 60*c* and 60*d* are located over two further labels 150. Mounting assembly 173 again descends, whereby pads 60*a* and 60*b* impart their labels to articles A while simultaneously pads 60*c* and 60*d* pick up additional labels 150. The assembly then rotates 180° (as indicated by arcuate arrow D), and the cycle is repeated, with the pad pairs 60*a*, 60*b*, 60*c*, and 60*d* alternatively functioning to pick up and release labels.

While various aspects of the invention have been set forth by the drawings and the specification, it is to be understood that the foregoing detailed description is for illustration only and that various changes in parts, as well as the substitution of equivalent constituents for those shown and described, may be made without departing from the spirit and scope of the invention as set forth in the appended claims.

We claim:

1. Apparatus for transferring a label from a carrier member to an article, comprising:

means for heating the label to a first temperature to permit removal from the carrier member;

an elastomeric, substantially deformable silicone transfer pad, comprising a polysiloxane resin, said pad having a convex curvature with a well-defined apex;

a flexible heating element embedded within the silicone material of said transfer pad, which heats the pad's surface by conduction to a second temperature lower than said first temperature; and means for pressing the silicone transfer pad against said label to adhere the label thereto and remove the label from the carrier member, and for thereafter pressing the silicone transfer pad and label against the article to bond the label to the article.

2. Apparatus as defined in claim 1, wherein the silicon material of said transfer pad further comprises plasticizer.

3. Apparatus as defined in claim 2 wherein the plasticizer comprises an oligomeric polysiloxane.

4. Apparatus as defined in claim 1, wherein the carrier member comprises a web, and the label heating means comprises a heated platen which heats the label through the web.

5. Apparatus as defined in claim 1 wherein the first temperature falls within the range 270° F.–420° F. and the second temperature falls within the range 100° F.–300° F.

6. Apparatus as defined in claim 5 wherein the first temperature falls within the range 300° F.–380° F. and the second temperature falls within the range 150° F.–250° F.

7. Apparatus as defined in claim 1 wherein the heating element comprises a flexible matrix of resistively heated wires.

8. Apparatus as defined in claim 1, wherein the resilient transfer pad has a surface texture in accordance with a desired texture of transferred labels.

9. Apparatus as defined in claim 1 wherein the resilient transfer pad has a hardness between 5 and 100, measured on the Shore 00 scale.

10. Apparatus as defined in claim 1 comprising a plurality of said transfer pads with transporting means for transporting the transfer pads so that a first transfer pad presses against a label to remove said label from a carrier concurrently with a second transfer pad's pressing a label against an article.

11. Apparatus as defined in claim 10 wherein the pad transporting means comprises: a support member to which said pads are mounted so that the first pad will be located adjacent a label pickup site when the second pad is located adjacent an article to be labeled;

means for reciprocating said support member toward and away from the substrate and article; and means for rotating said support member to convey pads between label pick-up and article decoration sites.

12. Apparatus for transferring a label from a carrier member to an article comprising:

means for heating the label to a first temperature to permit removal from a carrier member;

a hollow, substantially deformable silicone transfer pad, which is inflated with an inflation medium to a convex curvature with a well-defined apex and having a hardness between 5 and 100 as measured on the shore 00 scale;

means for heating the inflation medium of the inflated transfer pad to convectively heat the surface of the pad; and means for pressing the silicone transfer pad against said label to adhere the label thereto and remove the label from the carrier member, and for thereafter pressing the silicone transfer pad and article against the label to bond the label to the article.

13. Apparatus as defined in claim 12 wherein the carrier member comprises a web and the label-heating means comprises a heated platen which heats the label through the web.

14. Apparatus as defined in claim 12 wherein the first temperature falls within the range 270°–420° F. and the second temperature falls within the range 100°–300° F.

15. Apparatus as defined in claim 14 wherein the first temperature falls within the range 300°–380° F. and the second temperature falls within the range 150°–250° F.

16. Apparatus as defined in claim 12 wherein the silicone material includes a polysiloxane resin and a plasticizer.

17. Apparatus as defined in claim 12 wherein the silicone transfer pad has a surface texture in accordance with the desired texture of transferred labels.

18. Apparatus as defined in claim 12 wherein the elastomeric skin comprises a plurality of layers having local variations in wall thickness, thereby to control the inflated shape of the pad.

19. Improved pad decorating apparatus as defined in claim 12 wherein the inflating medium comprises air.

20. Improved pad decorating apparatus as defined in claim 12 wherein the inflating medium comprises a liquid.

21. Apparatus as defined in claim 12 comprising a plurality of said transfer pads with transporting means for transporting the transfer pads so that a first transfer pad presses against a label to remove said label from a carrier concurrently with a second transfer pad's pressing a label against an article.

22. Apparatus as defined in claim 21 wherein the pad transporting means comprises: a support member to which said pads are mounted so that the first pad will be located adjacent a label pickup site when the second pad is located adjacent an article to be labeled;

means for reciprocating said support member toward and away from the substrate and article; and means for rotating said support member to convey pads between label pick-up and article decoration sites.

* * * * *